United States Patent [19]
Mollico

[11] 3,930,225
[45] Dec. 30, 1975

[54] VEHICLE SAFETY INDICATING APPARATUS

[76] Inventor: Roxie Mollico, Rte. 4, Box 511, Duluth, Minn. 55802

[22] Filed: Jan. 16, 1975

[21] Appl. No.: 541,500

[52] U.S. Cl. .................... 340/62; 340/66; 340/264
[51] Int. Cl.² ........................................ H01H 35/14
[58] Field of Search ........... 340/62, 66, 71, 94, 262, 340/263, 264

[56] References Cited
UNITED STATES PATENTS

| | | | |
|---|---|---|---|
| 2,685,048 | 7/1954 | Schweitzer | 340/62 X |
| 2,857,488 | 10/1958 | Haley | 340/264 X |
| 3,171,917 | 3/1965 | Leichsenring | 340/71 X |
| 3,710,315 | 1/1973 | Scherenberg | 340/62 |

*Primary Examiner*—Alvin H. Waring
*Attorney, Agent, or Firm*—Wicks & Nemer

[57] ABSTRACT

Safety indicating apparatus is shown, in its preferred embodiment for use with motor vehicles, which will radiate a high intensity of light when the vehicle accelerator pedal is in an undepressed condition at any rate of speed of the vehicle and will radiate an intensity of light gradually varying and dimming with an increase in driving velocity of the vehicle to a fixed rate of speed when the accelerator pedal is in a depressed condition. A first switch actuated by the accelerator peddle of the motor vehicle electrically interconnects a power supply to a first or second circuit. The first circuit is electrically interconnected directly to a safety light and the second circuit is interconnected to the safety light through a second rheostat type switch. The second switch includes an elongated member having a first conductive portion which is resistive in nature and a second non-conductive portion and includes a contact moveable along the elongated member in response to a velocity member to provide an output indicative of the driving velocity of the vehicle.

10 Claims, 1 Drawing Figure

U.S. Patent  Dec. 30, 1975  3,930,225
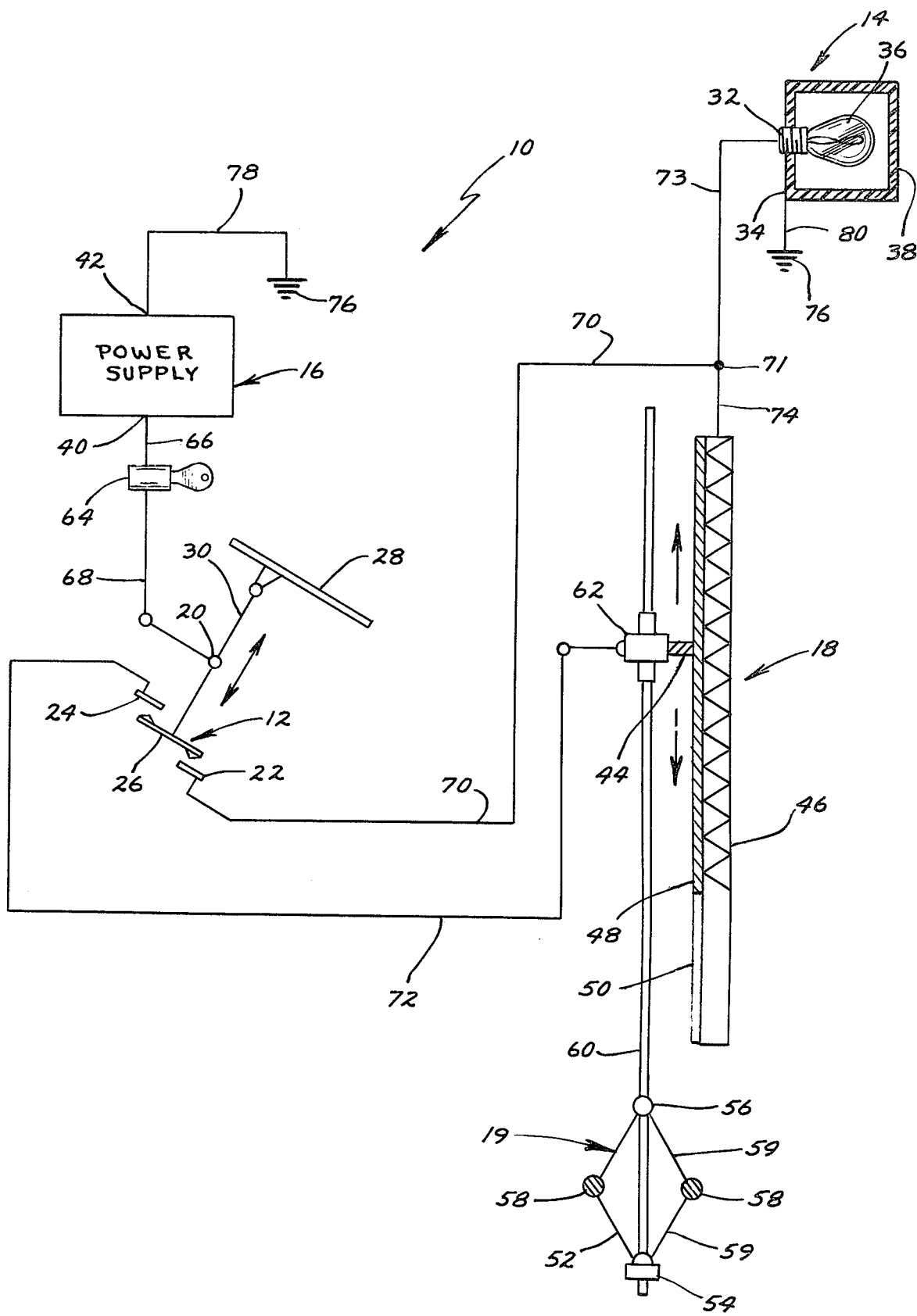

VEHICLE SAFETY INDICATING APPARATUS

BACKGROUND

The present invention relates generally to safety indicating apparatus and more specifically to safety indicating apparatus for use with motor vehicles.

With increasing numbers of motor vehicles using public highways, there is an increasing need for defensive driving to prevent motor vehicle accidents. Therefore, there is an increasing need for apparatus which will warn drivers of motor vehicles using the public highways of the actions of other motor vehicles. Such apparatus could allow motorists to foresee any actions taken by other motorist to give them forwarning of potential accident situations, and allow the drivers to defensively react thereto to avoid vehicle accidents. Such apparatus should be of a simple design, utilizing a single light source, and should thus maximize the materials used. Further, such apparatus should be related to a single pedal of the vehicle for ease of use.

SUMMARY

The present invention solves these and other problems of safety indicating apparatus by providing, in the preferred embodiment, safety indicating apparatus for use with motor vehicles having an accelerator pedal comprised of a first switch actuated by the accelerator pedal of the motor vehicle which electrically interconnects a power supply, for example the automobile battery, to a first or second circuit. The first circuit is electrically interconnected directly to a safety light, for example an automobile tail light, and the second circuit is electrically interconnected to the safety light through a second switch. The second switch includes a contact member movable along an elongated member having a first conductive portion of a fixed length and a second non-conductive portion covering the remaining length. A velocity member provides an output indicative of the driving velocity of the vehicle and includes a responsive member which moves the contact member along the elongated member corresponding to the output of the velocity member. Thus the safety indicating apparatus will radiate a high intensity of light when the accelerator pedal is in an undepressed condition and will radiate a high intensity of light to a fixed rate of speed when the accelerator pedal is in a depressed condition.

Also, in the preferred embodiment, the second switch is of the rheostat type allowing the intensity of the light rays radiating from the safety light to gradually vary with the driving velocity of the vehicle.

It is thus an object of the present invention to provide improved safety indicating apparatus.

It is a further object of the present invention to provide such safety indicating apparatus for use with motor vehicles.

It is a further object of the present invention to provide such safety indicating apparatus including means for allowing the intensity of the light rays to gradually vary with the driving velocity of the vehicle.

It is a further object of the present invention to provide such safety indicating apparatus of simple design.

It is a further object of the present invention to provide such safety indicating apparatus which maximizes the equipment and materials used.

It is a still further object of the present invention to provide such safety indicating apparatus which is relatively inexpensive to manufacture.

These and further objects and advantages of the present invention will become clearer in the light of the following detailed description of an illustrative embodiment of this invention described in connection with the drawings.

DESCRIPTION OF THE DRAWINGS

The FIGURE is a combined schematic/diagramatic view of a preferred embodiment of safety indicating apparatus in accordance with the teachings of the present invention.

DESCRIPTION

In the FIGURE, a preferred embodiment of a safety indicating apparatus generally designated 10, is shown for use with a motor vehicle, not completely shown. Safety indicating apparatus 10 includes a first switch 12, an accelerator safety light 14, a power supply 16, a second switch 18, and a velocity member 19. First switch 12 includes a first contact 20, a second contact 22, a third contact 24, and a bridging member 26. Switch 12 has a first switch position in which bridging member 26 electrically interconnects first contact 20 and second contact 22 and has a second switch position in which bridging member 26 electrically interconnects first switch contact 20 and third switch contact 24. Bridging member 26 is operatively connected to an accelerator pedal 28 of the motor vehicle by a linkage member 30. Linkage member 30 can be directly attached to accelerator pedal 28 as schematically/diagramatically shown in the FIGURE or to any linkage connected from accelerator pedal 28 to the carburetor, not shown, of the motor of the motor vehicle.

Safety light 14 includes a first contact 32, a second contact 34, light source 36, shown in this preferred form as a light bulb and still more preferred an automobile tail light bulb, and a diffusing member 38. Diffusing member 38 in its preferred form is amber-colored.

Power supply 16 in its preferred form is the battery conventionally used with the motor of the motor vehicle. Battery 16 includes a first terminal 40 and a second terminal 42. The first and second terminals 40 and 42 comprises one common terminal and one terminal of a voltage differing from the common terminal.

Second switch 18 includes a fourth contact 44 movable along an elongated member 46. Elongated member 46 includes a first conductive portion 48 covering a fixed length of elongated member 46 and a second non-conductive portion 50 covering the remaining length of elongated member 46. Second switch 18 is, in the preferred embodiment, of the rheostat type allowing the intensity at the light rays radiating from the safety light 14 to gradually vary with the driving velocity of the motor vehicle. Thus, first conductive portion 48 is resistive in nature such that as fourth contact 44 moves toward second non-conductive portion 50 the resistance along second switch 18 increases to reduce the current available to light safety light 14. Rheostat switch 18 may be of the wound wire type as shown, of the deposited type, or of similar types allowing the resistance to vary as a contact is moved along the length of elongated member 46.

Velocity member 19 includes a governor member 52 rotably connected to the drive train, not specifically shown, of the motor vehicle and includes a fixed sleeve 54, a movable sleeve 56, centrifically mounted balls 58, linkage 59 mounting balls 58 to fixed and moveable sleeves 54 and 56, respectfully, and a responsive member 60 shown in its preferred form as a rod attached to the movable sleeve 56 of governor 52. Fourth contact 44 is attached to rod 60 by a suitable attachment member 62.

First terminal 40 of battery 16 is electrically interconnected to an ignition switch 64 of the motor vehicle by connection 66. First contact 20 of first switch 12 is electrically interconnected to switch 64 by electrical connection 68. Second contact 22 of first switch 12 is electrically interconnected to a fifth switch contact 71 by electrical connection 70. Fifth contact 71 is electrically interconnected to first contact 32 of safety light 14 by electrical connection 73. Third contact 24 of switch 12 is electrically interconnected to fourth contact 44 by electrical connection 72. First conductive portion 48 is electrically interconnected to fifth contact 71 by electrical connection 74. Second terminal 42 of battery 16 is electrically interconnected to the automobile chassis or ground 76 by electrical connection 78. Second contact 34 of safety light 14 is similarly electrically interconnected to the automobile chassis or ground 76 by electrical connection 80. Therefore, second terminal 42 of battery 16 is electrically interconnected to second contact 34 of safety light 14 through connections 78 and 80 respectfully, by ground 76.

First switch 12 either electrically interconnects power supply 16 to a first series circuit or a second series circuit. The first circuit comprises power supply 16, first terminal 40, electrical connection 66, ignition switch 64, electrical connection 68, first contact 20, bridging member 26, second contact 22, electrical connection 70, fifth contact 71, electrical connection 73, first contact 34, safety light 14, second contact 34, ground 76, electrical connection 78, and second terminal 42. The second circuit comprises power supply 16, first terminal 40, electrical connection 66, ignition switch 64, electrical connection 68, first contact 20, bridging member 26, third contact 24, electrical connection 72, fourth contact 44, second switch 18 and generally either conductive portion 48 or nonconductive portion 50, electrical connection 74, fifth contact 71, electrical connection 73, first contact 32, safety light 14, second contact 34, ground 76, electrical connection 78, and second terminal 42.

Since governor 52 is rotably connected to the drive train of the motor vehicle, velocity member 19 provides an output indicative of the driving velocity of the vehicle. As the drive train rotates, the centrifically mounted balls 58 rotate at a radius about the axis of the governor 52, which in the preferred form lies along rod 60. When the drive train rotates at a faster rate, balls 58 rotate about the axis of governor 52 at a larger radius. Since linkage 59 connects balls 58 to sleeves 54 and 56, as the radius of balls 58 about the axis of governor 52 increases, movable sleeve 56 moves toward fixed sleeve 56 thereby compressing governor 52. Due to the fact that fourth contact 44 is attached to rod 60 by attachment member 62 and that rod 60 is attached to movable sleeve 56, as movable sleeve 56 moves toward fixed sleeve 54, fourth contact 44 moves along elongated member 46 a distance equal to the distance moved by movable sleeve 56.

It can now be realized that, as the driving velocity of the vehicle increases, fourth contact 44 will move along elongated member 46 toward the second non-conductive portion 50. Further, in the preferred embodiment, as fourth contact 44 moves along first conductive portion 48 towards second non-conductive portion 50, the resistance between fourth contact 44 and fifth contact 71 of second switch 18 increases as result of the resistive nature of conductive portion 48 thereby decreasing the current available to light 14 to gradually vary and dim the intensity of the light rays radiating from safety light 14. Therefore, the intensity of the light rays radiating from safety light 14 will vary without any abrupt changes according to the driving velocity of the vehicle while fourth contact 44 moves along conductive portion 48 of elongated member 46. When fourth contact 44 moves onto non-conductive portion 50 of elongated member 46, second switch 18 breaks the second circuit thus preventing the electrical interconnection between battery 16 and safety light 14, and thus safety light 14 will not radiate light.

Further, the fixed length of first conductive portion 48 of elongated member 46 can be of any length equal to the distance fourth contact 44 moves responsive to the velocity member 19 when the driving velocity of the motor vehicle is equal to a desired rate of speed. In the preferred embodiment, the fixed length of first conductive portion 48 of elongated member 46 is equal to the distance moved by the fourth contact 44 when the rate of speed equals thirty miles per hour.

Therefore safety light 14 will not radiate light when the driving velocity of the vehicle is greater than thirty miles per hour and when accelerator pedal 28 is in a depressed condition. It can now be appreciated that, when the accelerated pedal 28 is depressed, safety light 14 will radiate light at a large intensity when the driving velocity is zero or very small, and the intensity of the light would gradually diminish as the driving velocity increases, until safety light 14 goes out when the driving velocity is equal to a fixed rate of speed, preferably 30 mph.

OPERATION

Generally, in operating safety indicating apparatus 10 of the preferred embodiment of the present invention, safety light 14 will radiate a high intensity of light when accelerator pedal 28 is in an undepressed condition and will radiate an intensity of light gradually varying and dimming with the driving velocity of the vehicle to a fixed rate of speed when accelerator pedal 28 is in a depressed condition.

When the operator desires to start the motor of the vehicle, he will electrically interconnect battery 16 with first switch 12 when he activates ignition switch 64. If accelerator pedal 28 is in an undepressed condition when the motor vehicle is stationary, first switch 12 electrically activates the first circuit, as discussed hereinbefore, directly to safety light 14 causing it to radiate at a high intensity of light. If accelerator pedal 28 is in a depressed condition when the motor vehicle is stationary, switch 12 electrically activates the second circuit, as discussed hereinbefore, to control the intensity of safety light 14 through second switch 18. If the motor vehicle is in a stationary position, governor 52 is stationary and uncompressed. Therefore, fourth contact 44 is at the beginning portion of conductive portion 48 of elongated member 46. In this position, the resistance of switch 18 is at a minimum such that the resistance can be approximately equal to zero to allow light 14 to radiate light at an intensity equal to the intensity of light radiated by safety light 14 when the first switch 12 electrically activates the first circuit or such that the resistance can be greater than approximately zero such that the intensity of the light radiated from light 14 is less than the intensity of light radiated from safety light 14 when under the control of the first circuit. It can then be realized that when the motor vehicle is in a stationary condition with the ignition switch 64 on, safety light 14 will be electrically connected to battery 16 by first or second circuit and thus will radiate light therefrom, although the intensity of the light may vary slightly depending upon which circuit electrically interconnects safety light 14 to battery 16, as explained hereinbefore.

When the operator desires to drive the vehicle, he will depress accelerator pedal 28 thus electrically activating the second circuit by first switch 12. Since the second circuit electrically connects safety light 14 to battery 16 through second switch 18, the intensity of the light radiating from safety light 14 will vary gradually in relation to the resistance of second switch 18 due to the varying position of fourth contact 44 on conductive portion 48 of elongated member 46 as a result of the resistive nature at conductive portion 48. However when fourth contact 44 slides onto non-conductive portion 50, second switch 18 breaks the second circuit thus preventing electrical interconnection of safety light 14 with battery 16. Therefore, safety light 14 will not radiate light after fourth contact 44 moves the fixed length of conductive portion 48 unto non-conductive portion 50, when the driving velocity of the vehicle reaches a fixed rate of speed, such as thirty miles per hour in the preferred embodiment.

At a low driving velocity, safety light 14 will radiate light at a high intensity but will gradually decrease in intensity as the driving velocity increases. In the preferred embodiment, the intensity of safety light 14 will vary from the high intensity equal to the full intensity of light 14 when electrically interconnected by first circuit to an intensity of zero when the driving velocity of the vehicle is thirty miles per hour. Should the operator maintain a constant velocity below thirty miles per hour, safety light 14 will radiate light at a constant intensity corresponding to the position of fourth contact 44 on conductive portion 48 of elongated member 46. However, if the operator should remove his foot from accelerator pedal 28 such as to prepare to brake the motor vehicle, accelerator pedal 28 will return to its undepressed condition thus electrically interconnecting safety light 14 to the first circuit through first switch 12 such that safety light 14 will radiate light at a high intensity.

When driving velocity of motor vehicle exceeds thirty miles per hour, fourth contact 44 is located on non-conductive portion 50 of elongated member 46, thus breaking the second circuit. Therefore, if the accelerator is in a depressed condition, either to further accelerate the motor vehicle or to maintain the vehicle at a constant driving velocity, safety light 14 does not radiate light. However, should the operator remove his foot from the accelerator pedal 28, first switch 12 will electrically interconnect safety light 14 to battery 16 through the first circuit thus safety light 14 will radiate light immediately at a high intensity, even though the driving velocity exceeds 30 miles per hour.

Now that the teachings of the present invention have been disclosed, it will be immediately apparent that safety indicating apparatus 10 will aid in defensive driving. Safety light 14 would warn other drivers whether the driver of the motor vehicle was accelerating or slowing down, thereby warning other drivers by at least a 2 second warning that the operator is going to apply the brakes.

Thus, since the invention disclosed herein may be embodied in other specific forms without departing from the spirit or general characteristics thereof, some of which forms have been indicated, the embodiment described herein is to be considered in all respects illustrative and not restrictive. The scope of the invention is indicated by the appended claims, rather than by the foregoing description, and all changes which come within the meaning and range of equivalency of the claims are intended to be embraced therein.

What is claimed is:

1. Safety indicating apparatus for use with motor vehicles having an accelerator pedal comprising in combination:
   a. first switch member including a first contact, a second contact, and a third contact and having a first switch position electrically interconnecting the first contact and the second contact and having a second switch position electrically interconnecting the first switch contact and the third switch contact;
   b. safety light member, including a first contact and a second contact;
   c. a power supply having a first terminal and second terminal with the first and second terminals comprising one common terminal and one terminal of a voltage differing from the common terminal;
   d. an electrical connection between the first terminal of the power supply and the first contact of the first switch;
   e. an electrical connection between the first contact of the safety light and the second contact of the first switch;
   f. an electrical connection between the second terminal of the power supply and the second contact of the safety light;
   g. second switch including a fourth contact, a fifth contact, and an elongated member, with the elongated member including a first conductive portion covering a fixed length of the elongated member and a second non-conductive portion covering the remaining length of the elongated member and with one of the contacts moveable along the elongated member and with the other of the contacts being electrically interconnected to the first conductive portion;
   h. an electrical connection between the third contact of the first switch and the fourth contact of the second switch;
   i. an electrical connection between the fifth contact of the second switch and the first contact of the safety light;
   j. means for operatively connecting the first switch to the accelerator pedal for causing the switch to be placed in its first position when the accelerator pedal is undepressed and causing the switch to be placed in its second position when the accelerator pedal is depressed; and
   k. velocity means for providing an output indicative of the driving velocity of the vehicle including means responsive to the output of the velocity means for moving the fourth contact along the elongated member.

2. The apparatus of claim 1 wherein the velocity means comprises a governor rotably connected to the drive train of the vehicle including a fixed sleeve, a movable sleeve and centrifically mounted balls and wherein the responsive means comprises a rod attached to the movable sleeve of the governor and the fourth contact.

3. The apparatus of claim 2 wherein the fixed length of the first conductive portion of the elongated member is equal to the distance the rod is displaced when the driving velocity of the motor vehicle is equal to a fixed rate of speed.

4. The apparatus of claim 1 wherein the fixed length of the first conductive portion of the elongated member is equal to the distance the fourth contact is moved by the responsive means when the driving velocity of the motor vehicle is equal to a fixed rate of speed.

5. The apparatus of claim 3 wherein the fixed rate of speed is 30 miles per hour.

6. The apparatus of claim 1 wherein the second switch further comprises means for allowing the intensity of the light rays radiating from the safety light to gradually vary with the driving velocity of the vehicle.

7. The apparatus of claim 6 wherein the second switch comprises a rheostat.

8. The apparatus of claim 6 wherein the fixed length of the first conductive portion of the elongated member is equal to the distance the fourth contact is moved by the responsive means when the driving velocity of the motor vehicle is equal to a fixed rate of speed.

9. The apparatus of claim 8 wherein the fixed rate of speed is 30 miles per hour.

10. The apparatus of claim 6 wherein the velocity means comprises a governor rotably connected to the drive train of the vehicle including a fixed sleeve, a movable sleeve and centrigally mounted balls and wherein the responsive means comprises a rod attached to the movable sleeve of the governor and the fourth contact.

* * * * *